US007482705B2

(12) United States Patent
Piercey, III

(10) Patent No.: US 7,482,705 B2
(45) Date of Patent: Jan. 27, 2009

(54) GENERATOR SUPPORT PLENUM

(76) Inventor: Gerald S. Piercey, III, 5227 W. Rose Garden La., Glendale, AZ (US) 85308

( * ) Notice: Subject to any disclaimer, the term of this patent is extended or adjusted under 35 U.S.C. 154(b) by 725 days.

(21) Appl. No.: 10/845,305

(22) Filed: May 12, 2004

(65) Prior Publication Data

US 2005/0005601 A1 Jan. 13, 2005

Related U.S. Application Data

(60) Provisional application No. 60/470,011, filed on May 12, 2003.

(51) Int. Cl.
*F02B 63/04* (2006.01)
*H02K 7/18* (2006.01)

(52) U.S. Cl. .................................................... 290/1 A

(58) Field of Classification Search .................. 290/1 A
See application file for complete search history.

(56) References Cited

U.S. PATENT DOCUMENTS

| | | | | | |
|---|---|---|---|---|---|
| 1,484,526 | A | * | 2/1924 | O'Connor | 181/239 |
| 1,947,713 | A | * | 2/1934 | Gumpper | 290/1 A |
| 2,019,026 | A | * | 10/1935 | Spear et al. | 290/1 B |
| 2,177,687 | A | * | 10/1939 | Frank et al. | 290/1 A |
| 2,789,234 | A | * | 4/1957 | Davies et al. | 290/1 R |
| 2,832,430 | A | * | 4/1958 | Coombs | 181/262 |
| 3,159,238 | A | * | 12/1964 | Shearer | 181/213 |
| 3,227,240 | A | * | 1/1966 | Robert et al. | 181/217 |
| 3,386,528 | A | * | 6/1968 | Kurtze | 181/218 |
| 3,396,535 | A | * | 8/1968 | Milos | 60/307 |
| 3,429,281 | A | * | 2/1969 | Gutridge | 410/95 |
| 4,007,587 | A | * | 2/1977 | Banthin et al. | 60/204 |
| 4,018,046 | A | * | 4/1977 | Hurley | 60/264 |
| 4,099,375 | A | * | 7/1978 | Inglee | 60/39.5 |
| 4,128,769 | A | * | 12/1978 | Bons et al. | 290/52 |
| 4,136,432 | A | * | 1/1979 | Melley, Jr. | 29/469 |
| 4,147,230 | A | * | 4/1979 | Ormond et al. | 181/231 |
| 4,181,347 | A | * | 1/1980 | Clark | 378/199 |
| 4,191,356 | A | * | 3/1980 | Ashmun et al. | 248/678 |
| 4,192,402 | A | * | 3/1980 | Nakagawa et al. | 181/256 |
| 4,215,537 | A | * | 8/1980 | Hurley | 60/264 |
| 4,312,480 | A | * | 1/1982 | Miller | 239/127.3 |
| 4,415,066 | A | * | 11/1983 | Mensik | 187/242 |
| 4,449,746 | A | * | 5/1984 | Clark | 378/208 |
| 4,454,837 | A | * | 6/1984 | Luebke | 119/401 |
| 4,487,289 | A | * | 12/1984 | Kicinski et al. | 181/252 |
| 4,661,734 | A | * | 4/1987 | Capuano et al. | 310/89 |

(Continued)

*Primary Examiner*—Nicholas Ponomarenko
*Assistant Examiner*—Pedro J Cuevas
(74) *Attorney, Agent, or Firm*—Gallagher & Kennedy, P.A.; Thomas D. MacBlain

(57) ABSTRACT

A generator support plenum for a engine-generator set for installation on a pickup truck in an RV or on a boat, for example, sits in or under or forms a part of an enclosure for the engine-generator set and defines cool air flow paths into the set for cooling the engine and generator and aspirating the engine. The plenum also defines a warm air outlet duct for escape of the cooling air. In the outlet duct a diffuser couples to the exhaust of the engine to mix hot exhaust with the much cooler escaping cooling air that has passed over the engine and generator. The diffuser eliminates the effect of the extreme hot exhaust gas and muffles the engine sound. Insulation coating the internal surfaces of the plenum further suppresses engine noise.

1 Claim, 15 Drawing Sheets

U.S. PATENT DOCUMENTS

| | | | | | |
|---|---|---|---|---|---|
| 4,694,190 | A * | 9/1987 | Lane et al. | 290/52 |
| 4,698,975 | A | 10/1987 | Tsukamoto et al. | 60/721 |
| 4,747,467 | A * | 5/1988 | Lyon et al. | 181/218 |
| 4,792,014 | A * | 12/1988 | Shin-Seng | 181/280 |
| 4,835,405 | A * | 5/1989 | Clancey et al. | 290/1 A |
| 4,992,669 | A * | 2/1991 | Parmley | 290/1 R |
| 5,058,704 | A * | 10/1991 | Yu | 181/262 |
| 5,162,620 | A * | 11/1992 | Ross et al. | 181/220 |
| 5,198,625 | A * | 3/1993 | Borla | 181/248 |
| 5,227,593 | A * | 7/1993 | Takahashi et al. | 181/255 |
| 5,533,869 | A * | 7/1996 | Garrison et al. | 417/234 |
| 5,590,806 | A * | 1/1997 | Green et al. | 220/562 |
| 5,620,111 | A * | 4/1997 | Gehman | 220/571 |
| 5,620,620 | A * | 4/1997 | Feldhausen et al. | 219/133 |
| 5,642,702 | A | 7/1997 | Kouchi et al. | 123/198 E |
| 5,663,537 | A * | 9/1997 | Ko et al. | 181/228 |
| 5,678,512 | A * | 10/1997 | Colton | 123/2 |
| 5,694,889 | A | 12/1997 | Ball et al. | 123/41.7 |
| 5,731,687 | A | 3/1998 | Hirano et al. | 322/1 |
| 5,740,670 | A * | 4/1998 | Woods | 60/310 |
| 5,744,940 | A * | 4/1998 | Colton et al. | 322/1 |
| 5,762,232 | A * | 6/1998 | Green et al. | 220/564 |
| 5,804,946 | A * | 9/1998 | Gaubatz et al. | 322/1 |
| 5,869,793 | A * | 2/1999 | Berger et al. | 181/256 |
| 5,899,174 | A | 5/1999 | Anderson et al. | 123/2 |
| 5,929,394 | A | 7/1999 | Westerbeke, Jr. | 181/204 |
| 5,960,637 | A * | 10/1999 | Stevens et al. | 62/77 |
| 6,035,633 | A * | 3/2000 | Woods | 60/310 |
| 6,091,160 | A * | 7/2000 | Kouchi et al. | 290/1 A |
| 6,100,599 | A * | 8/2000 | Kouchi et al. | 290/1 A |
| 6,103,995 | A * | 8/2000 | Bankstahl | 219/133 |
| 6,134,879 | A * | 10/2000 | Frawley et al. | 60/39.5 |
| 6,308,914 | B1 * | 10/2001 | Spurway et al. | 244/53 R |
| 6,376,944 | B1 | 4/2002 | Grizzle, Jr. et al. | 310/52 |
| 6,385,967 | B1 * | 5/2002 | Chen | 60/312 |
| 6,520,124 | B2 * | 2/2003 | Bohm, II | 123/2 |
| 6,532,398 | B2 * | 3/2003 | Matsumoto | 700/213 |
| 6,546,312 | B1 * | 4/2003 | Matsumoto | 700/213 |
| 6,606,854 | B1 * | 8/2003 | Siefker et al. | 60/262 |
| 6,608,392 | B2 * | 8/2003 | Matsumoto | 290/1 A |
| 6,684,719 | B2 * | 2/2004 | Gehner et al. | 73/863 |
| 6,765,304 | B2 * | 7/2004 | Baten et al. | 290/1 A |
| 6,792,897 | B2 * | 9/2004 | Higuchi et al. | 123/2 |
| 6,832,665 | B2 * | 12/2004 | Crombeen | 181/275 |
| 6,928,890 | B2 * | 8/2005 | Gehner et al. | 73/863 |
| 7,017,690 | B2 * | 3/2006 | Burke | 180/24.07 |
| 7,049,707 | B2 * | 5/2006 | Wurtele | 290/1 B |
| 7,066,170 | B1 * | 6/2006 | Atemboski et al. | 126/518 |
| 7,081,682 | B2 * | 7/2006 | Campion | 290/1 A |
| 7,100,459 | B2 * | 9/2006 | Gehner et al. | 73/863.03 |
| 7,111,448 | B2 * | 9/2006 | Anderson | 60/204 |
| 7,122,913 | B2 * | 10/2006 | Witten et al. | 290/1 A |
| 7,152,410 | B2 * | 12/2006 | Sheoran et al. | 60/782 |
| 7,163,571 | B2 * | 1/2007 | Ruan | 95/226 |
| 7,191,792 | B2 * | 3/2007 | Hendrix | 137/312 |
| 7,221,061 | B2 * | 5/2007 | Alger et al. | 290/1 R |
| 7,245,033 | B2 * | 7/2007 | Wurtele | 290/1 A |
| 7,398,747 | B2 * | 7/2008 | Onodera et al. | 123/41.65 |
| 7,399,455 | B2 * | 7/2008 | Fan | 423/210 |
| 2002/0000342 | A1 | 1/2002 | Yamada et al. | 181/204 |
| 2002/0121780 | A1 | 9/2002 | Westerbeke, Jr. | 290/1 A |
| 2002/0121818 | A1 | 9/2002 | Turner et al. | 310/58 |
| 2003/0070651 | A1 * | 4/2003 | Higuchi et al. | 123/300 |
| 2003/0121722 | A1 * | 7/2003 | Crombeen | 181/275 |
| 2003/0205096 | A1 * | 11/2003 | Gehner et al. | 73/863 |
| 2004/0068981 | A1 * | 4/2004 | Siefker et al. | 60/262 |
| 2004/0089078 | A1 * | 5/2004 | Gehner et al. | 73/863 |
| 2004/0093963 | A1 * | 5/2004 | Gehner et al. | 73/863 |
| 2005/0035121 | A1 * | 2/2005 | Rodgers et al. | 220/88.1 |
| 2005/0103003 | A1 * | 5/2005 | Crombeen | 60/319 |
| 2005/0224284 | A1 * | 10/2005 | Ohno et al. | 181/272 |
| 2005/0241874 | A1 * | 11/2005 | Jacquemont et al. | 180/309 |
| 2005/0252459 | A1 * | 11/2005 | Johnson et al. | 123/2 |
| 2005/0274117 | A1 * | 12/2005 | Sheoran et al. | 60/782 |
| 2005/0284292 | A1 * | 12/2005 | Ruan | 95/226 |
| 2006/0237242 | A1 * | 10/2006 | Burke | 180/23 |
| 2007/0068167 | A1 * | 3/2007 | Patel et al. | 60/772 |
| 2007/0101987 | A1 * | 5/2007 | Atemboski et al. | 126/518 |
| 2007/0176426 | A1 * | 8/2007 | Hirose et al. | 290/1 A |
| 2007/0204614 | A1 * | 9/2007 | Kolb | 60/599 |
| 2007/0245725 | A1 * | 10/2007 | Brown et al. | 60/317 |
| 2007/0267870 | A1 * | 11/2007 | Ambrose | 290/1 A |
| 2008/0023965 | A1 * | 1/2008 | Cagliari et al. | |
| 2008/0129053 | A1 * | 6/2008 | Piercey | |
| 2008/0141667 | A1 * | 6/2008 | Winter et al. | 60/324 |
| 2008/0149118 | A1 * | 6/2008 | Oglesby et al. | 131/194 |

* cited by examiner

GENERATOR SUPPORT PLENUM

CROSS REFERENCE TO RELATED APPLICATIONS

This application claims priority from the provisional patent application Ser. No. 60/470,011 filed May 12, 2003 in the name of Gerald S. Piercey, III entitled "Compressor Mount Plenum" incorporated herein by reference.

FIELD OF THE INVENTION

This invention relates to an intake and exhaust plenum for a generator and more particularly to a plenum that supports the generator.

BACKGROUND

Generators used with recreational vehicles (RVs), on boats and those mounted on trucks for use at a worksite more often than not are intrusively noisy and direct hot exhaust fumes where they should not. In older RV parks, for example, insufficient electrical service often is available for when the park is well-filled with newer RVs that boast a multiplicity of electrical appliances, air conditioners and the like. Where that is the case, RV owners typically crank up their own generators. Generally these are too noisy for use in a crowded RV park, and often gasoline engine exhaust is directed out the side directly towards the next door neighbor. When the generator is in or on the RV itself, vibrations as well as noise will plague the RV occupant. Moreover, an on-board generator is (or can be) a fire hazard.

Likewise, at a worksite, noise and noxious exhaust fumes can, again, annoy persons in the neighborhood of a truck-mounted generator. And the generator may be run for hours on end. Emission of very hot exhaust from the internal combustion engine of an engine-generator set is a hazard to neighbors, pets and close-by objects in a tightly populated camp site or RV park.

A further problem that has arisen in connection with engine-generator sets used to power electrical appliances on houseboats, yachts and the like has been the collection of carbon monoxide in living and sleeping quarter. In at least one locality where vacationers regularly rent houseboats, sickness and fatalities have occurred.

RV owners who would appreciate relocation of a noisy generator may not want an engine-generator set sitting on the tow vehicle. A metal toolbox spanning the bed of a pickup truck directly behind the cab is viewed as aesthetically permissible by RV users and other pickup truck owners, but a freestanding, installed generator is not necessarily so-viewed.

There is a need, therefore, for a generator housing and support that reduces noise, correctly directs and dilutes engine exhaust and has a neat and acceptable appearance.

BRIEF SUMMARY

The invention relates to a plenum that (1) cools hot exhaust exiting an engine-generator set, (2) channels engine cooling air and air for combustion into the generator enclosure, (3) mounts or supports the generator neatly inside a pickup toolbox or other enclosure, and (4) reduces noise. In one embodiment, a generator support truck for example, the plenum fits within a containment box which is the toolbox of a pickup and opens through openings formed in a wall of the box. (By "wall" is meant the box's bottom, lid or any of its upright walls.) In another embodiment the plenum supports the toolbox itself within which the generator is contained and communicates through openings through a toolbox wall. In a third embodiment the plenum and toolbox are combined into a single unit. Removal of the generator to the tow vehicle, away from the RV, reduces the risk of fire and eliminates the vibration of the RV. Exhaust can be directed away from the RV and any neighbor.

In the case where an engine-generator set must be located in the generator compartment of an RV, the containment box and plenum of the invention can still improve the problems of noise and hot exhaust gas being wrongly directed. In several exemplary preferred embodiments, the box and plenum with air intake ducts opening to atmosphere draw in air to aspirate the engine and cool the engine and generator, while cooling air being exhausted is intermixed with hot exhaust before expulsion from the generator-containing box. In one case the box protrudes through the floor of the RV generator compartment and has openings into the plenum and out of the plenum through sidewalls just below the floor of the compartment. In another case floor openings in an RV generator compartment align with openings into the air intake duct and out of the air outlet duct.

Hot exhaust from the internal combustion engine is mixed with warmed cooling air that, while warm, is nevertheless very much cooler than the exhaust, and the intermixed gasses are dispersed from an outlet duct formed by the plenum. Diffusers of various shapes and designs can be connected to the tailpipe of the internal combustion engine driving the generator. Holes along the length of the diffuser emit the hot exhaust into the cooler, cooling air that is on its way to atmosphere. Thus intermixed, the gaseous output from the box that houses the engine-generator set is far cooler and safer than hot exhaust.

The above and further objects and advantages of the invention will be better understood from the following detailed description of at least one preferred embodiment of the invention, taken in consideration with the accompanying drawings.

DETAILED DESCRIPTION

Figure 1:
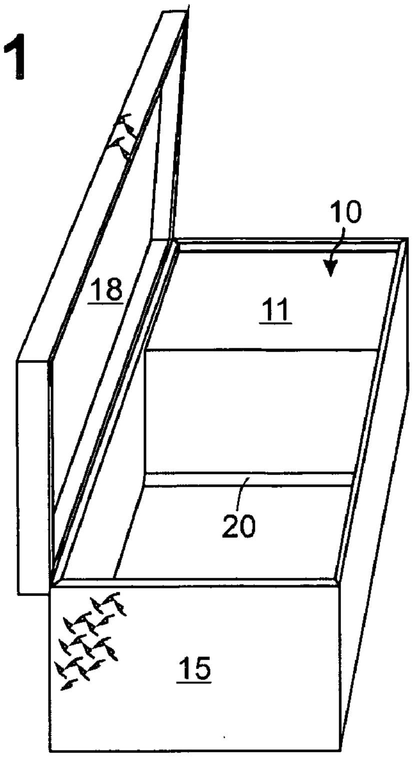
FIG. 1 is a perspective view of a toolbox-style enclosure for a generator and housing a generator support plenum.

In FIG. 1 an engine-generator set 10 supported by the plenum 20 in a toolbox 15. The engine-generator set 10 is referred to on occasion here as the generator 10 or the "generator" as such usage is common. A central wall 22 (FIG. 2) conforms a pair of ducts 23 and 24 to the gas intake and output provisions (not shown) of the engine-generator set 10 having an outer case 11.

Figure 2:
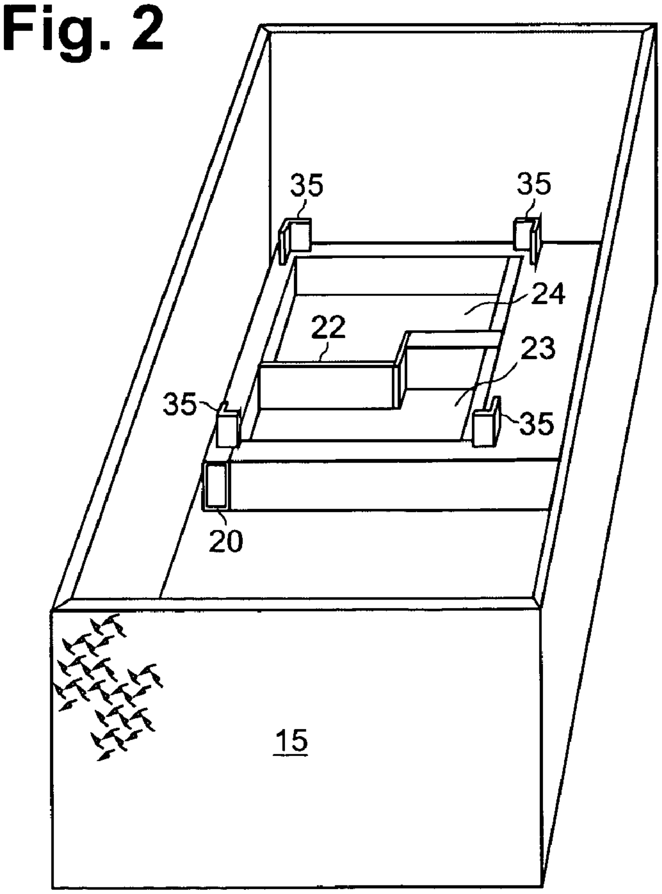
FIG. 2 is a fragmentary perspective view of the enclosure of FIG. 1 with the generator removed to expose the plenum.

The duct 23 of FIG. 2 is the air intake duct and fits under openings in the case 11 (FIG. 1) through which the generator 10 draws cooling air into the generator enclosure and over the internal combustion engine and generator. It, the duct 23, also fits under and opens into an ignition air intake opening in the generator case 11 that provides air for combustion within the internal combustion engine that drives the generator.

The duct 24 is the air outlet duct that allows the escape of the cooling air and also the exhaust of the generator driving engine. Into the duct 24 flows the cooling air exiting the generator enclosure and the hot exhaust from the engine's tail pipe. The escaping cooling air is ordinarily warm, but far cooler than the hot exhaust from the engine. The term "warm cooling air" used herein means simply cooling air raised in temperature by its passage over and around the generator and engine. The mixing of air and exhaust to cool the exhaust is safer for individuals and objects near to the emergent gases, and it also protects sound-proofing applied to interior duct surfaces for noise abatement. In a preferred embodiment a diffuser assures the thorough mixing of the hot exhaust into the much cooler escaping cooling air. Specific diffusers for this purpose are discussed below in connection with FIGS. 9-12.

Figure 3:
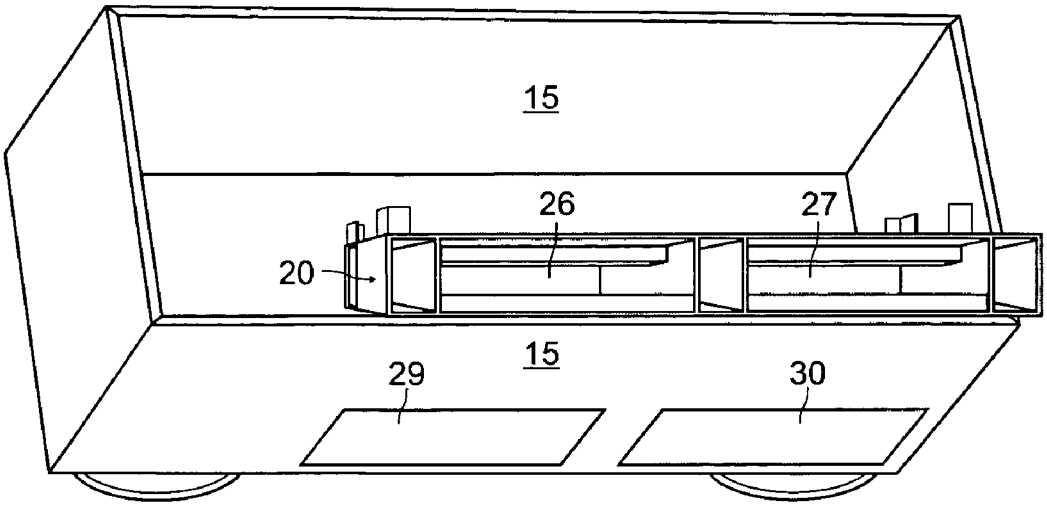
FIG. 3 is a fragmentary perspective view of the enclosure of FIG. 1 and the plenum and illustrates aligning openings through the enclosure into the plenum.
Figure 4:
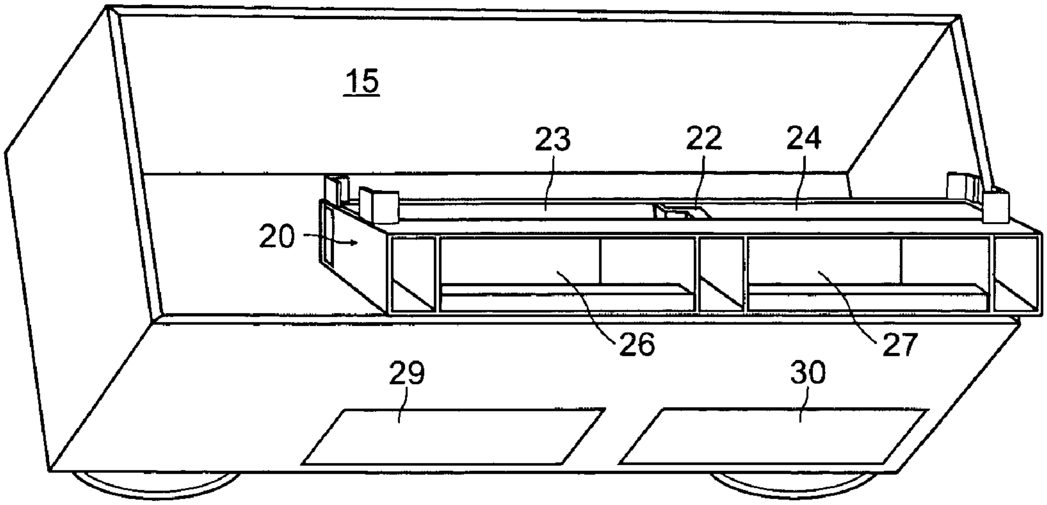
FIG. 4 is a perspective view of the plenum of FIG. 3.
Figure 5:
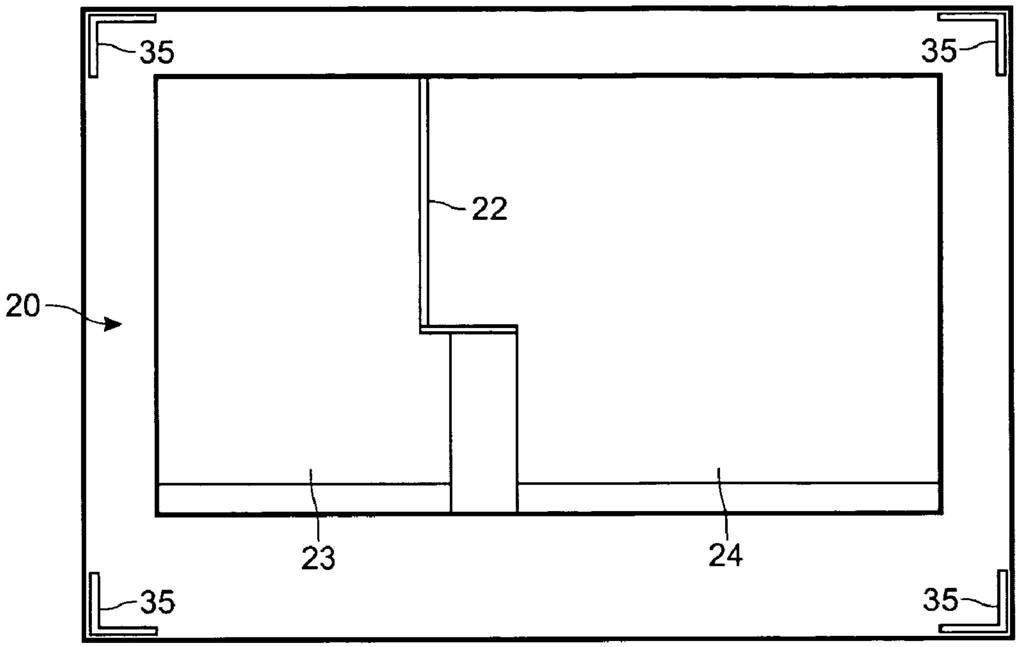
FIG. 5 is a top plan view of the plenum of FIG. 3.
Figure 26:
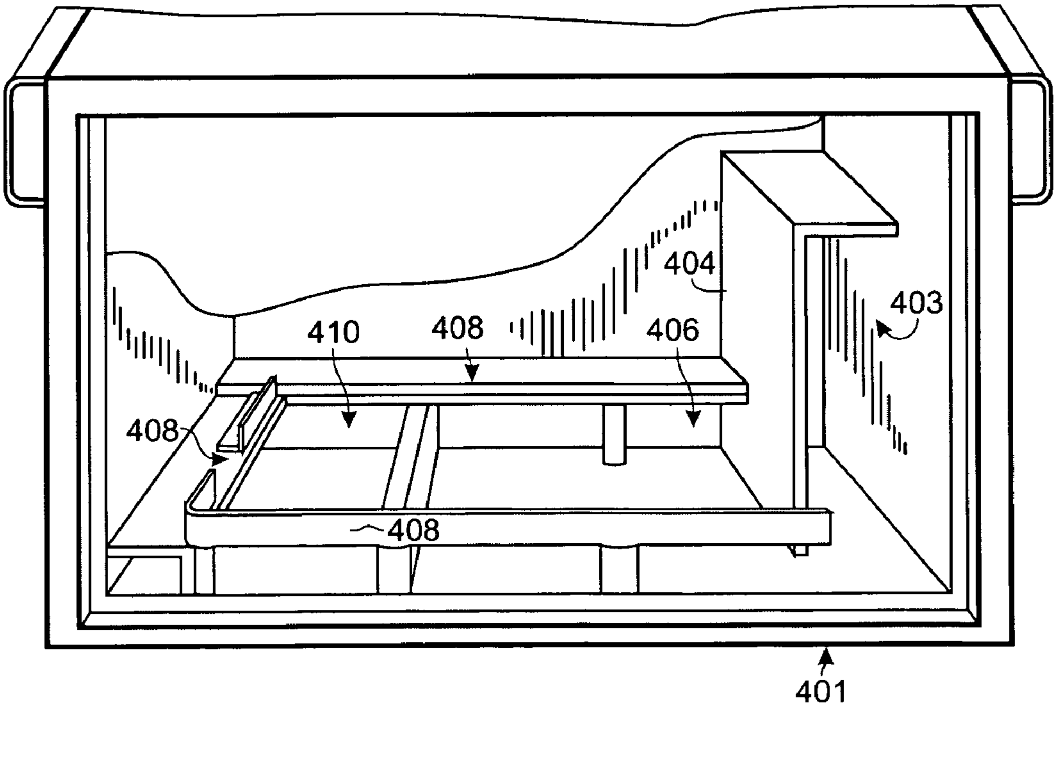
FIG. 26 is a fragmentary perspective view of the plenum and enclosure of FIG. 24 showing the cool air intake opening therein.

In FIG. 3 openings 26 and 27 of the plenum can be seen. With the plenum in place in the box 15, the opening 26 that draws in air aligns with an opening 29 in the face of the box. The opening 27 of the plenum aligns with an opening 30 for emission of the intermixed cooling air and exhaust. The central wall 22 stands as a partition between the cool intake air in duct 23 (FIG. 5) and the much warmer and mixed air and exhaust in duct 24 (FIG. 5). A suitable resilient seal runs along the top of the wall 22 to engage the bottom of the generator case 11 between the intake and outlet openings. Not shown in FIG. 5, the seal may be a soft rubber or rubber-like tubular seal 326 like the seal of FIG. 24. Four short angle irons 35 upstanding at the top of the plenum engage comers of the generator case 11 to hold the generator 10 in place. These are best seen in FIGS. 4 and 5. Any suitable alternative feature can be used for locating the generator and keeping it in place such as a continuous rim around the bottom of the generator case 11. Such a rim is shown in FIG. 26 at 408, for example.

Figure 6:
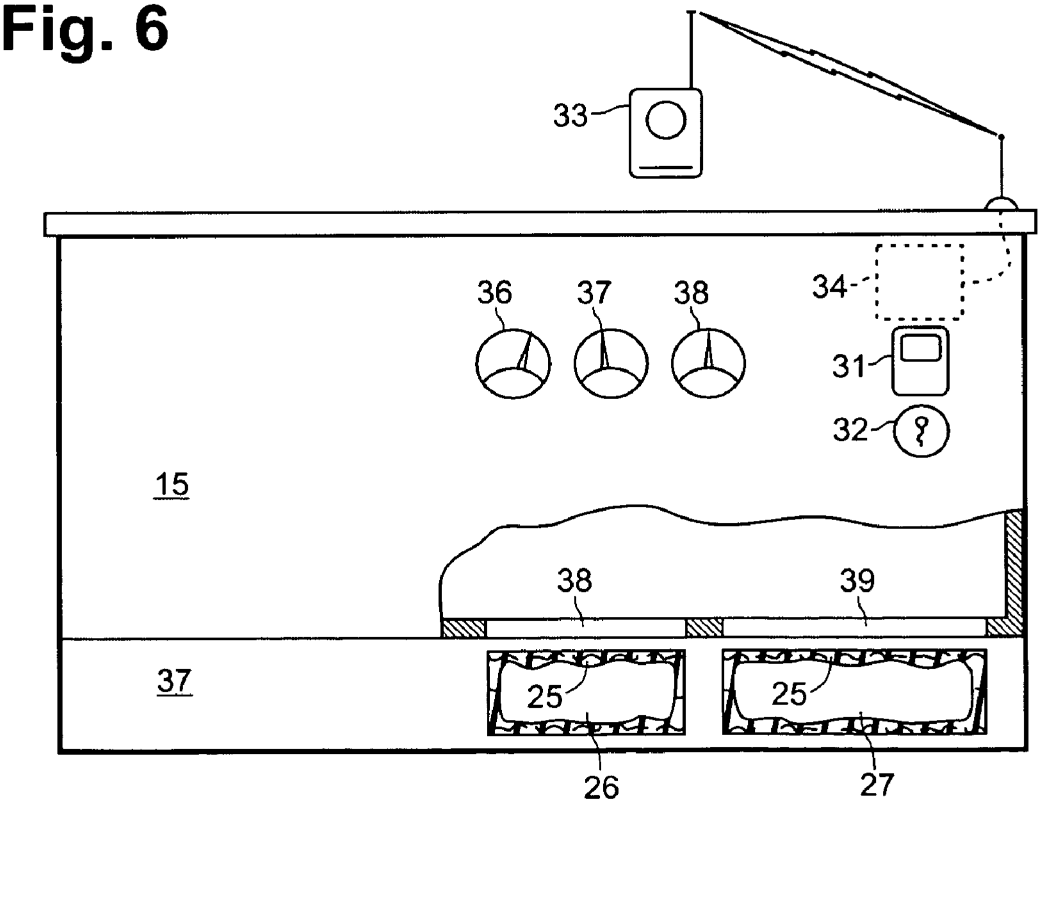
FIG. 6 is a front elevation view of a further embodiment of the enclosure of FIG. 1 with parts broken away for clarity.

In an alternative embodiment of the invention, as shown in FIG. 6, a plenum 37 supports the entire toolbox 15. The interior ducts and the openings 26 and 27 are similar to those described above. Openings 38 and 39 are cut into the bottom wall of the box 15. These conform generally in size and shape to the openings 19 and 21 of the plenum as shown in FIG. 2. In this embodiment as well as in that previously described, within the ducts 23 and 24 suitable soundproofing 25 covers every interior surface. The soundproofing 25 may be a commercially available duct insulation and may afford a degree of heat insulation as well, keeping the box outer surface relatively cool.

Figure 7:
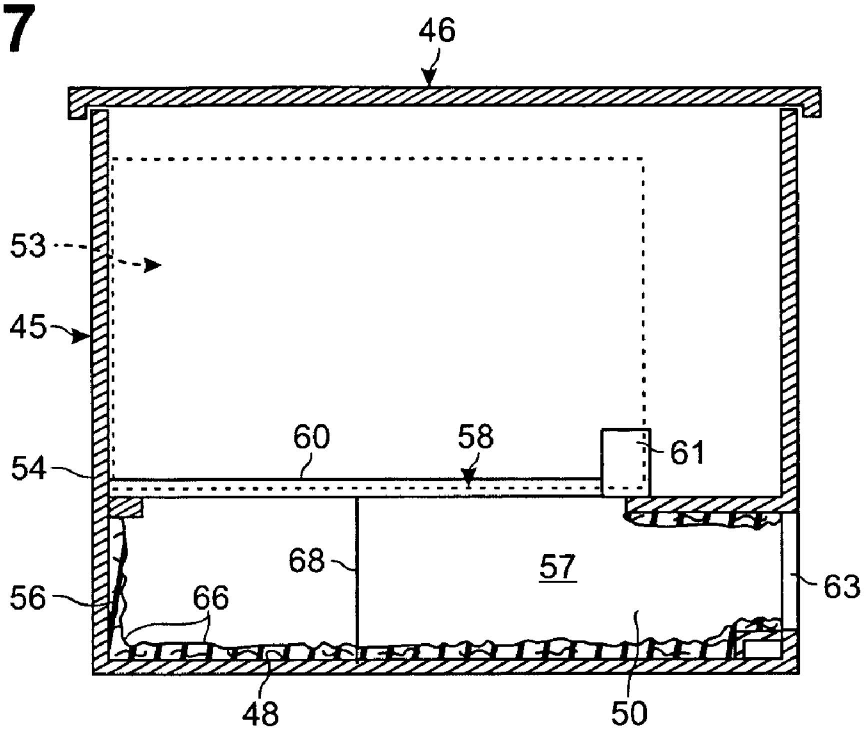
FIG. 7 is a side cross-sectional view of a further embodiment of an enclosure and plenum according to the invention.
Figure 8:
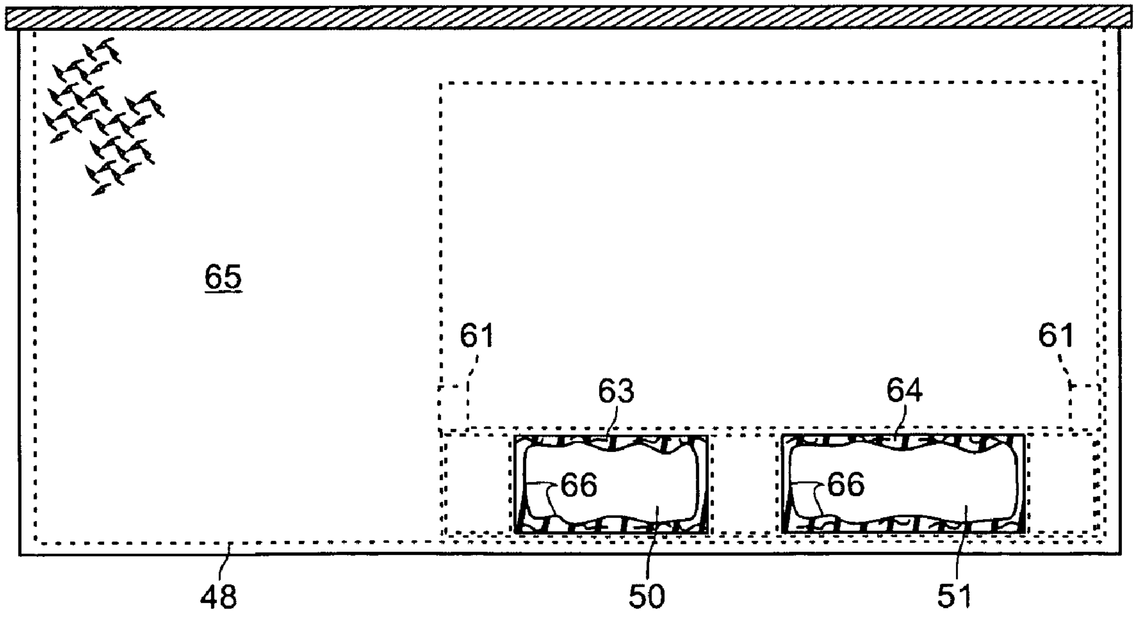
FIG. 8 is a front elevation view of the enclosure and plenum of FIG. 7.

In yet another alternative embodiment as shown in FIGS. 7 and 8, the toolbox and plenum are constructed together as a single unit. The toolbox 45 is shown with a lid 46. The toolbox bottom 48 serves as the bottom wall of the plenum ducts 50 and 51. The location of the engine-generator set and enclosure is indicated in broken lines at 53. A rear wall 54 for the box 45 serves also as the back wall of the plenum at 56. A wall 57 partitions the cool intake air at 50 from the hot gases escaping at 51. In FIG. 7, at 58 can be seen the opening by which air passes from the upper surface of the plenum. Two or more upright generator locating brackets 61 serve to locate the generator and keep it in place. A seal 60 runs along the top of the wall 57 sealing and engaging the bottom of the generator enclosure. As in the boxes of FIGS. 1-5, a pair of openings, here 63 and 64, through the face of the box front wall 65 open into the ducts 50 and 51, respectively. Soundproofing is visible at 66. The bend in the wall 57 evident in the wall 22 of FIG. 2 is seen at 68 in FIG. 7.

It is also envisioned that if the air intake openings, the cooling air outlet opening and the tail pipe of the generator open through a lid, front, back, side wall or bottom of the generator enclosure, a similar plenum will stand upright next to that wall or have a portion thereof standing upright next to the wall and be conformed to supply air into the openings and receive air and exhaust from within the generator enclosure. Again soundproofing is applied to interior duct surfaces. The plenum toolbox combination may simply be positioned in the basement of an RV or in an RV generator compartment to discharge the mixed, quieted discharge in the downward direction for the RV user who cannot put the box in his truck but still wants a quiet, sound-proofed installation. The plenum intake and discharge may be in the downward or underside of the generator enclosure as described below.

Figure 18:
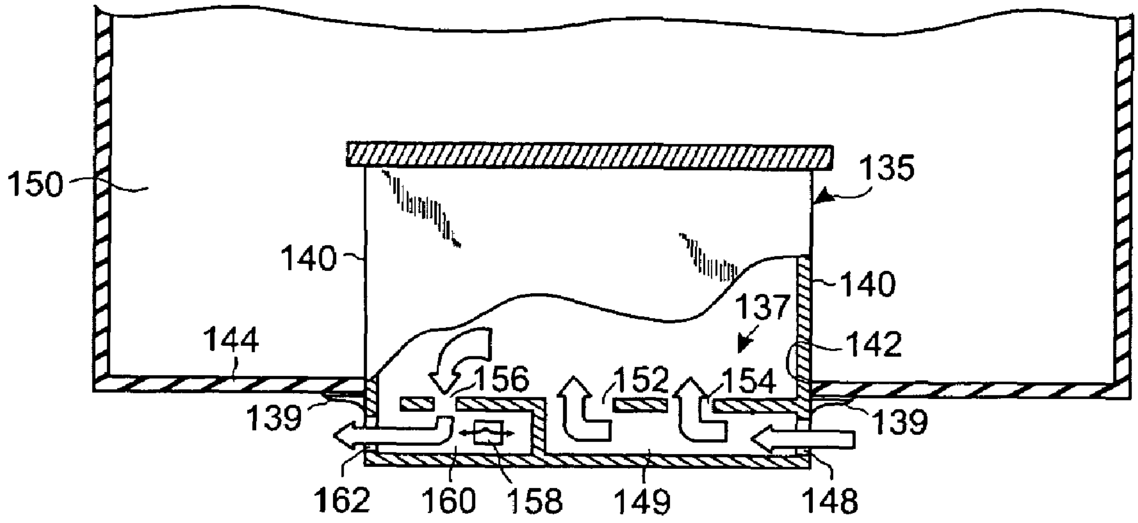
FIG. 18 is a fragmentary cross-sectional and diagrammatic view illustrating a toolbox-type enclosure and plenum for a generator installed through the floor of an RV generator compartment.
Figure 19:
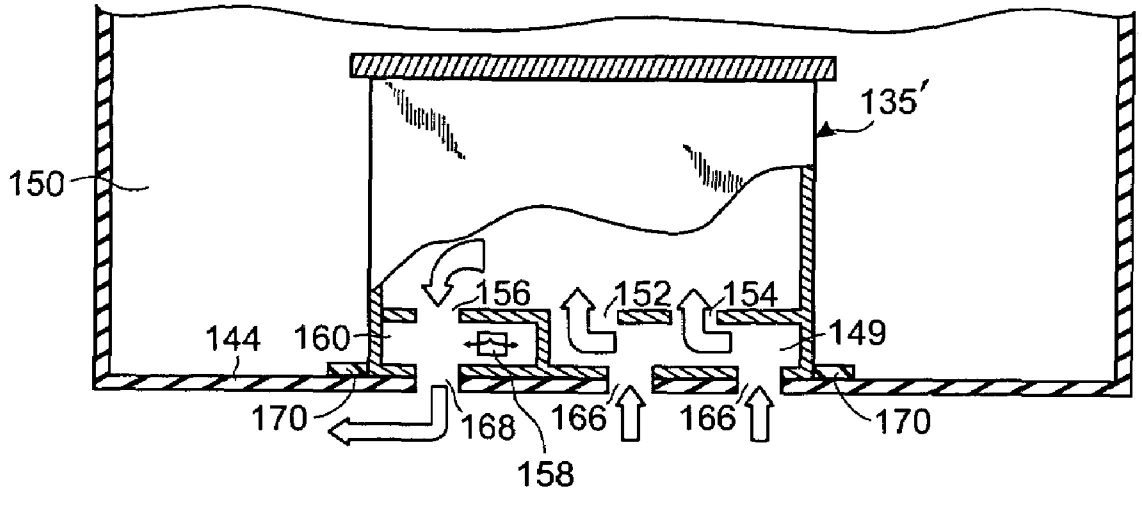
FIG. 19 is a fragmentary cross-sectional and diagrammatic view of a toolbox and plenum generator installation installed within an RV generator compartment and opening through holes in the compartment floor.

FIGS. 18 and 19 illustrate two alternate arrangements for use of the box and plenum combination of the invention in an RV generator compartment. In FIG. 18 a box 135 includes a lower plenum 137 that supports the engine-generator set as previously described. A number of mounting flanges 139 secured to sidewalls 140 of the box 135 secure the box 135 in an opening 142 in the floor 144 of the RV generator compartment 150.

The lowermost portion of the box 135 that contains the plenum 137 protrudes below the floor 144 of the generator compartment. Cooling air intake opening 148 leads into cooling air intake duct 149. The duct 149 communicates with the engine-generator set through a pair of openings 152 and 154, providing combustion and cooling air as previously described. Cooling air exits the environment of the engine-generator set through an opening 156 and an exhaust diffuser 158 as previously described. This diffuser 158 disperses exhaust into the lower temperature cooling air within the air outlet duct 160 for emission through a further opening 162.

In an alternative embodiment seen in FIG. 19, the box 135' containing the engine-generator set is contained entirely within the RV generator compartment 150. One or more openings 166 formed in the floor 144 of the compartment 150 provide air intake to the intake duct 149. That air acts as described in connection with FIG. 18 to aspirate the engine and cool the generator and engine. Cooling air escapes through the opening 156 into the duct 160 formed in the plenum and out an opening 168 formed in the floor 144 of the generator compartment. Suitable securing means 170 may be provided to retain the box 135' in place within the compartment 150.

Gasoline and battery power can be taken from the truck or tow vehicle or can be separately installed in the box 15 of FIG. 1. With a separate fuel tank and battery installed in this box, a completely independent power source is provided that can be used at a cabin or, e.g., mountain retreat, but that goes home with the owner, for theft prevention, and for further uses away from the cabin or retreat. In FIG. 6 the box 15 is equipped with the generator's off/on switch 31 and/or ignition key switch 32 and/or a RF remote 33 and remotely activated ignition switch 34. Also mounted are such meters 36-38 as may be desired. These typically would include engine hours of use, temperature, oil pressure, amperage, without limitation. The RF remote 33 and RF activated switch 34 are particularly desirable features allowing activation of the generator 10 from within an associated RV, for example.

Figure 9:
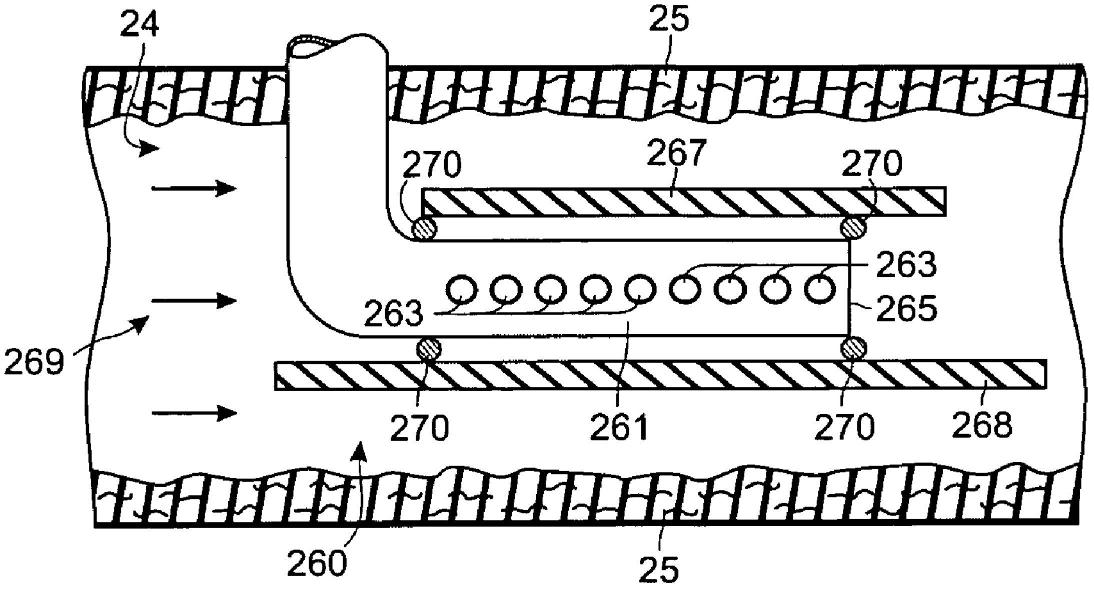
FIG. 9 is a fragmentary cross-sectional view of an exhaust diffuser located in a duct within a plenum in accordance with the invention.
Figure 10:
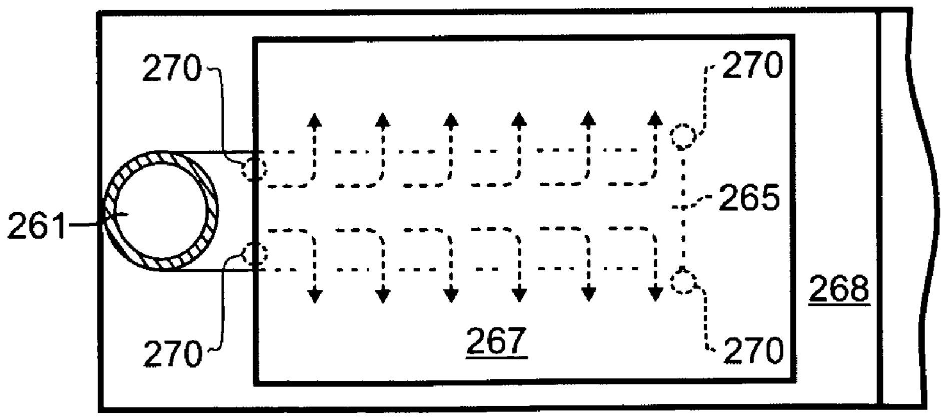
FIG. 10 is a top plan view, partly in cross-section, of the diffuser of FIG. 9.

FIGS. 9 and 10 illustrate an embodiment of a diffuser providing for good mixing of hot exhaust gas with the cooler, but warm, cooling air exiting the generator through the duct 24. The diffuser 260 includes an exhaust pipe 261 having linearly arranged openings 263 on opposite sides of the pipe along a length of a pipe extending within the duct 24. A solid or vented end plate 265 is welded across the end of the pipe 261. A pair of heat shields 267 and 268 protect the plenum walls and its soundproofing from the heat of the pipe 261 and the escaping exhaust. The diffuser 260 affords good mixing of the exiting cooling air (indicated at 269) with the hot exhaust from openings 263 of the pipe 261, indicated by the unnumbered arrows in FIG. 10. A set of welds 270 affix a top heat shield 267 to the pipe 261 and a set of welds 271 affix a lower, larger heat shield 268 to that pipe.

Figure 11:
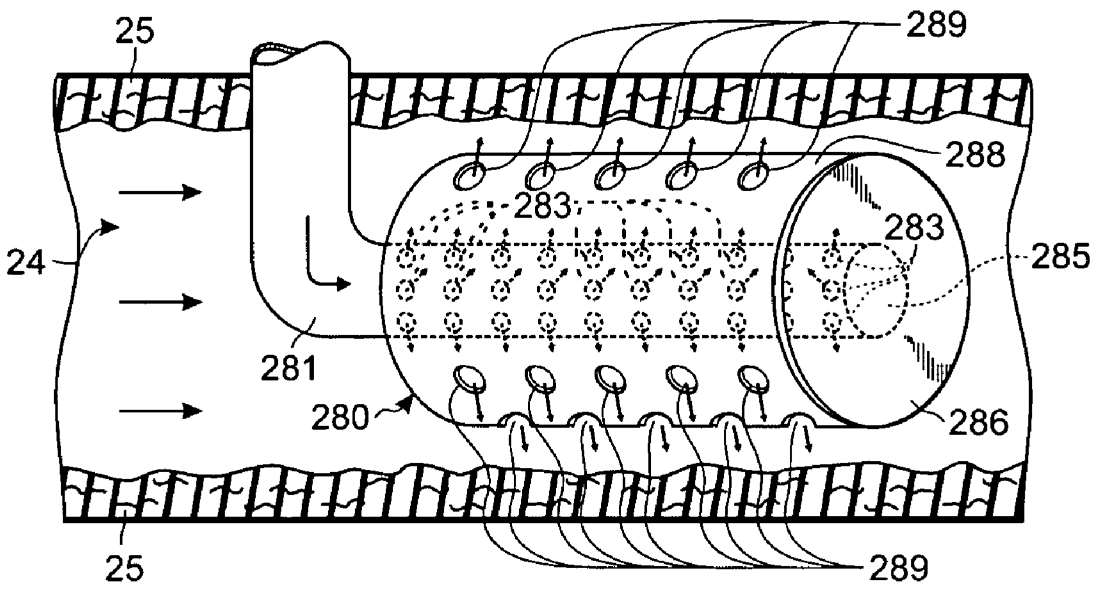
FIG. 11 is a fragmentary perspective view of a further exhaust diffuser in a duct in the plenum of the invention.
Figure 12:
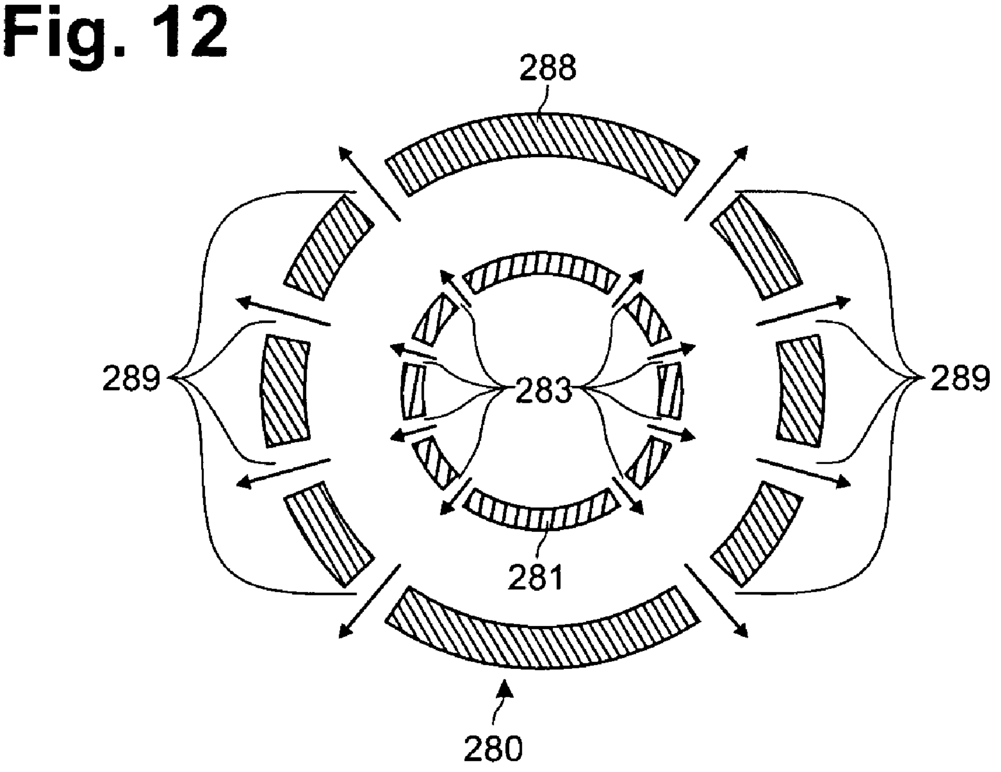
FIG. 12 is a cross-sectional view of the diffuser of FIG. 11.

The diffuser 260 of FIGS. 9 and 10 is preferable for a relatively shallow duct 24 as depicted in FIG. 9. Where greater depth in the duct 24 is available, as depicted in FIG. 11, a diffuser 280 as illustrated in FIGS. 11 and 12 can be used. Like the diffuser of FIGS. 9 and 10, the diffuser 280 has an exhaust pipe 281. A series of holes 283 open from within the pipe 281. Unlike the diffuser of FIGS. 9 and 10, the holes 283 are not arranged in just a single linear array, but open, in this exemplary embodiment, in several directions on each side of the pipe 281 as best seen in FIG. 12. The pipe 281 has a closed end 285. At the closed end 285, a circular plate 286 extends radially outward from the pipe 281. Connected with the plate 286 is a cylindrical shell 288 encircling the location of the pipe 281 that has the holes 283. The plate 286 may close the end of the pipe 281 and the end of the shell 288. The plate may have openings venting the pipe and shell ends. The cylindrical shell 288 has a series of openings 289 larger than the openings 283 in the pipe 281. These open out of the shell radially in, for example, four directions on each side of the shell as best seen in FIG. 12. Although shown as circular in cross-section, the diffuser of FIG. 11 can be oval, square, rectangular, etc., in its cross-section. The outer shell 288 provides heat shielding and gives additional mixing of air and exhaust.

Air that is cooler than the hot exhaust and that is being moved by an engine cooling blower or fan in the generator enclosure is driven into the outer shell 288. It mixes with hot exhaust and the intermixed air and exhaust exits the shell through the openings 289 at a moderated temperature. Good mixing of the cooler engine cooling air and hot exhaust results, protecting the walls of the duct 24 and its soundproofing.

Figure 13:
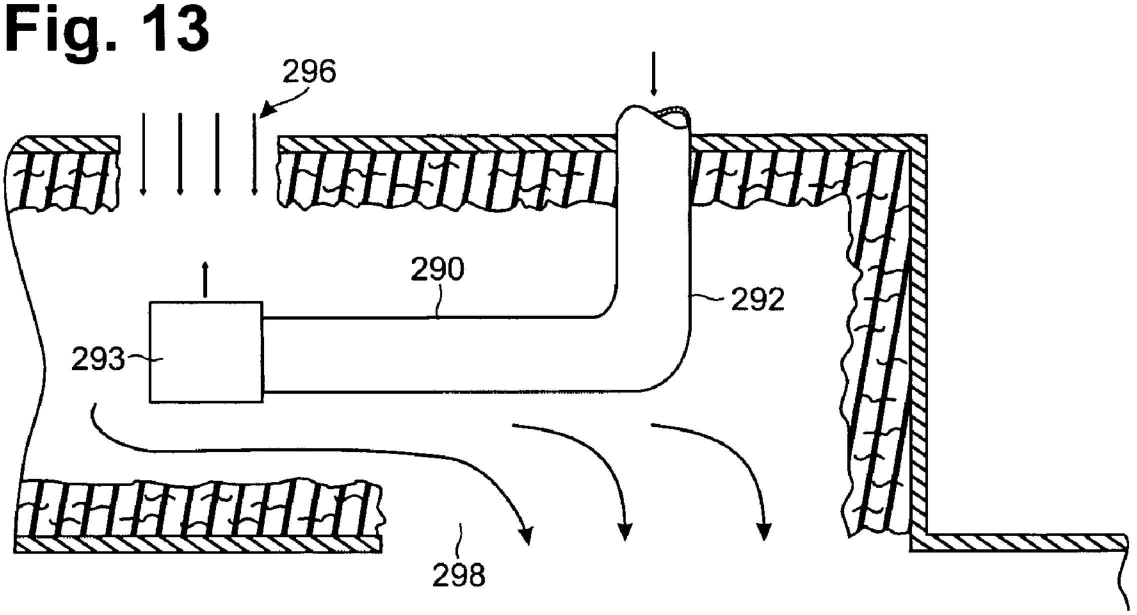
FIG. 13 is a fragmentary cross-sectional view of a further embodiment of a diffuser in a duct in a plenum according to the invention.
Figure 14:
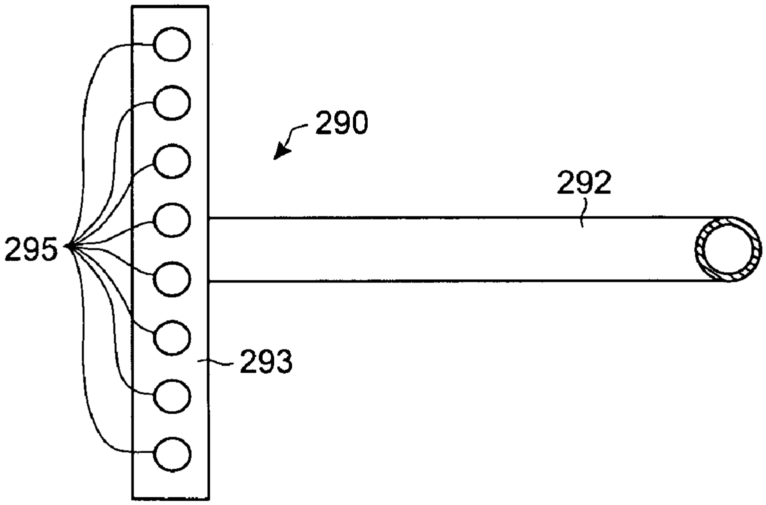
FIG. 14 is a top plan view, partially in cross-section, of the diffuser of FIG. 13.

An alternative diffuser embodiment and gas flow arrangement appear in FIGS. 13 and 14. The diffuser 290 includes an exhaust pipe 292 onto which a head 293 is affixed. Multiple openings 295 in the head emit hot exhaust against the flow of cooler engine cooling air entering the plenum at 296. The mixed gasses escape downward through an opening 298.

Figure 20:
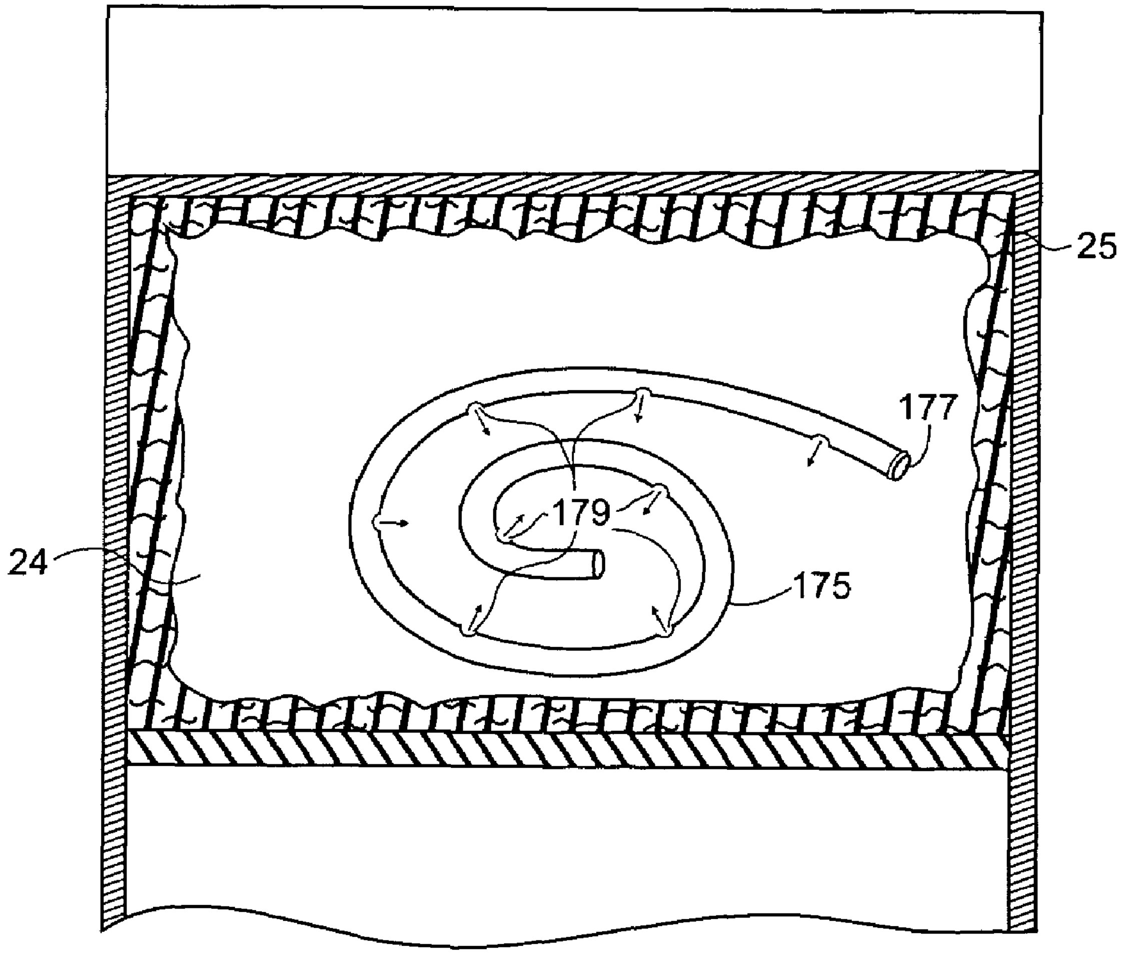
FIG. 20 is a cross-sectional top view of a plenum illustrating a spiral wound diffuser.
Figure 21:
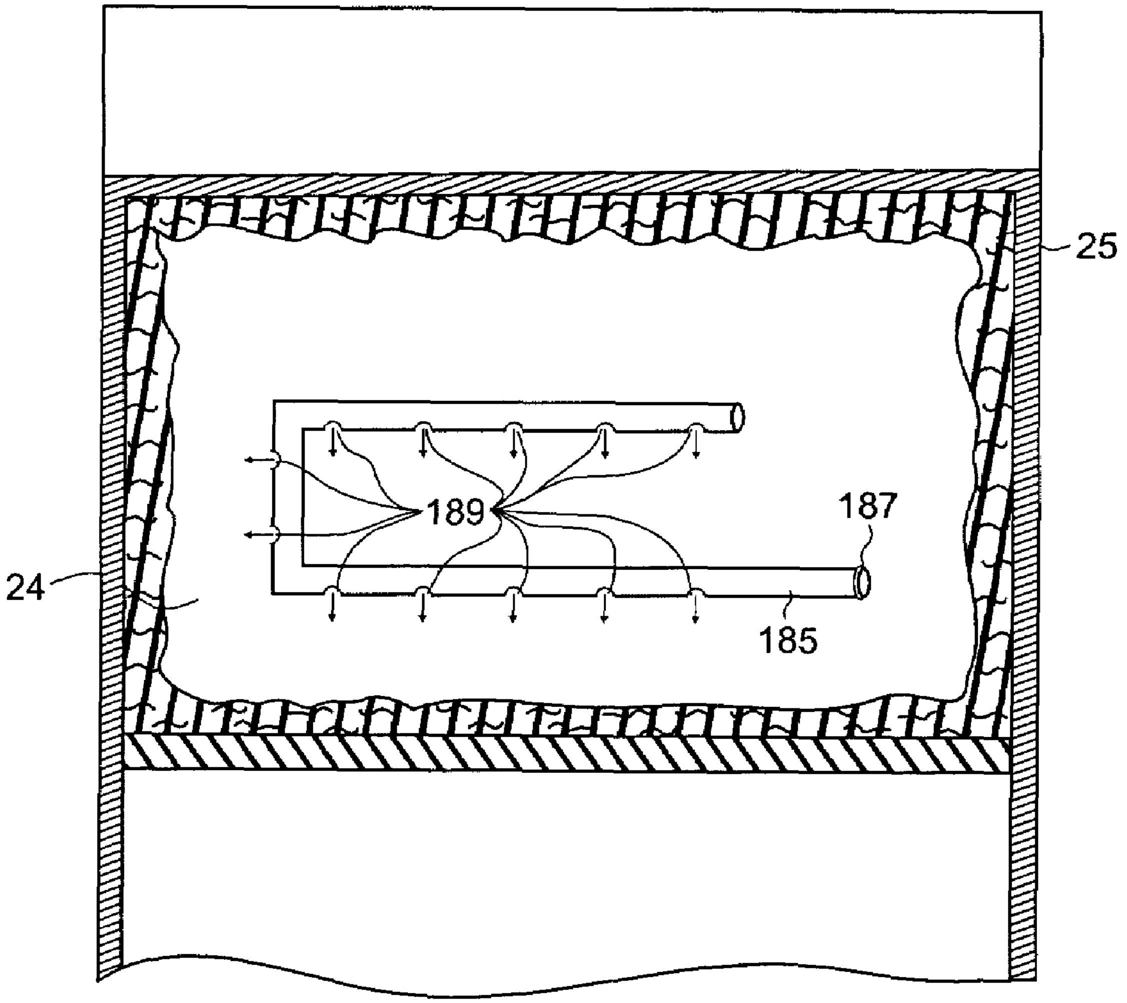
FIG. 21 is a top cross-sectional view of a plenum illustrating a generally U-shaped diffuser.
Figure 22:
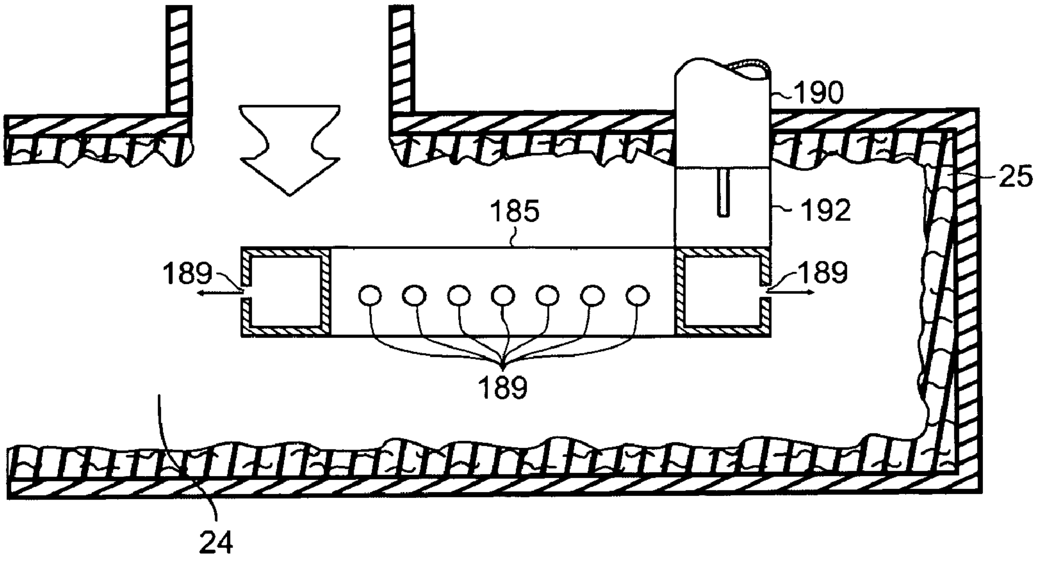
FIG. 22 is a cross-sectional side view of a plenum diagrammatically illustrating the U-shaped diffuser of FIG. 21.

Further exemplary diffuser embodiments are shown in FIGS. 20, 21 and 22. In FIG. 20 a rolled exhaust dispersion tube 175 is shown. An exhaust connection is diagrammatically indicated at 177 and a series of inward directed holes 179 emit hot exhaust in the directions indicated by the unnumbered arrows. The diffuser 175 of FIG. 20 is seen from above looking down into the air outlet duct 24.

In FIG. 21 a further, generally U-shaped diffuser 185 is seen, again looking downward into the air outlet duct 24. An exhaust connection to the diffuser is diagrammatically indicated at 187. Holes 189 along the length of the diffuser direct hot exhaust in the directions indicated by the unnumbered arrows.

A side view of the diffuser 185 of FIG. 21 is illustrated in FIG. 22. There the tailpipe 190 of the generator-driving internal combustion engine (not shown) is seen extending through an upper surface of the plenum where a coupling 192, that may be welded in place, connects the tailpipe 190 to the diffuser 185. In the case of the diffuser 185 shown in FIG. 22, the diffuser is formed from cut and welded sections. Various shapes and configurations, suited to particular installations, can be obtained.

Use of a diffuser such as the diffusers 260, 280, 290, 175 and 185 results in well-mixed gases escaping the duct 24 without hot spots. In addition, each of the diffusers 60, 80, 90, 175 and 185 converts the typical "putt, putt" exhaust sound to a steady hum.

Figure 15:
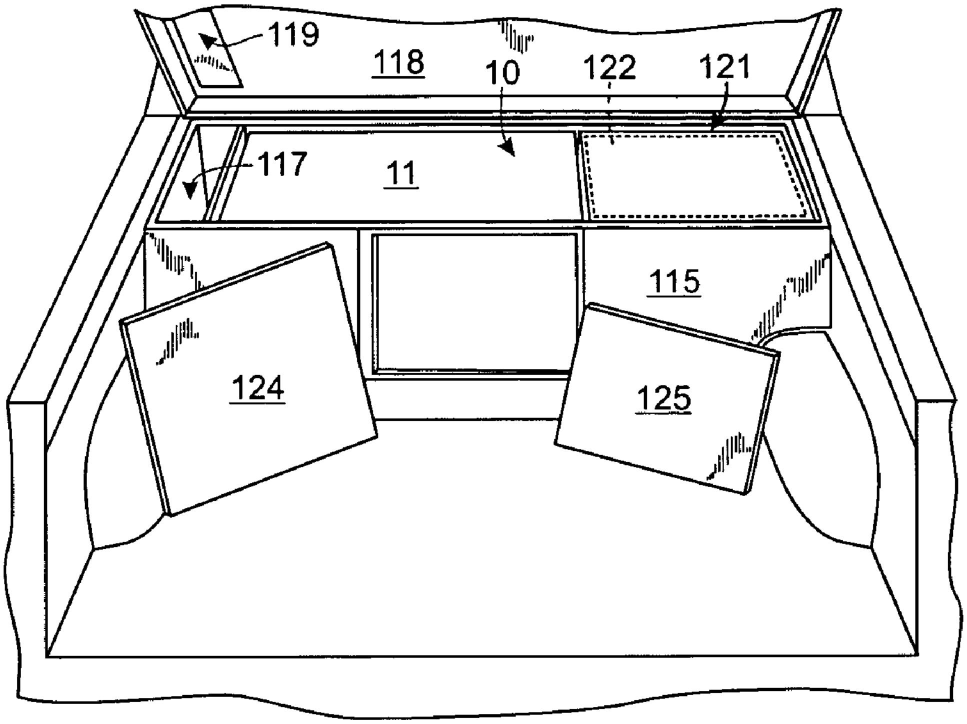
FIGS. 15 and 16 are fragmentary perspective views of a toolbox with generator support and cooling provisions in accordance with a further embodiment of the invention and showing in FIG. 15 the box open and in FIG. 16 the box closed, both installed in a pickup truck.
Figure 16:
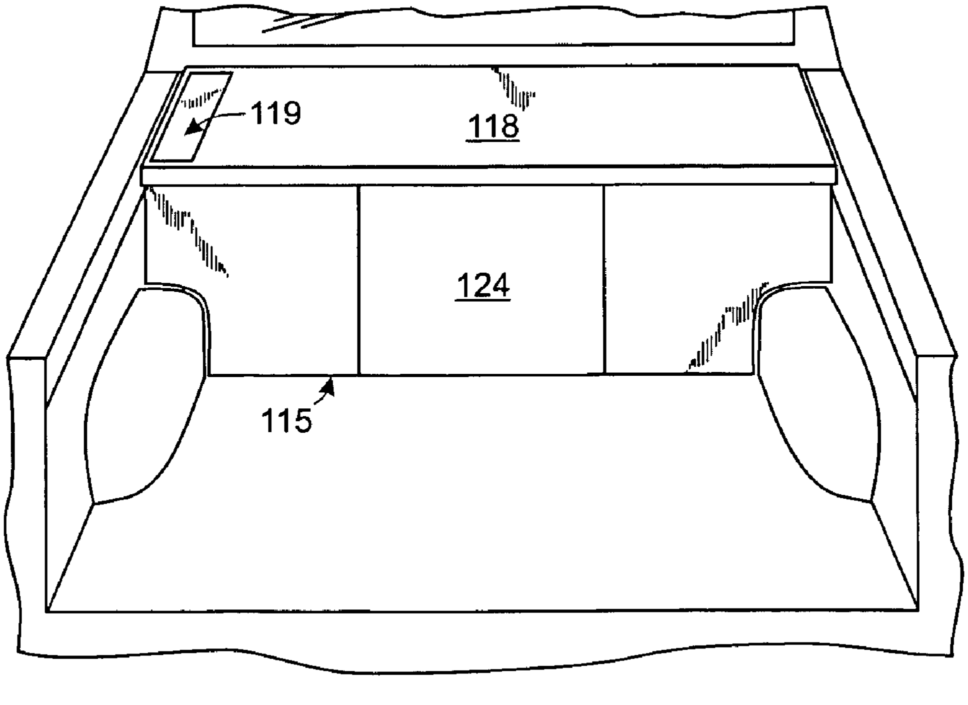

FIGS. 15 and 16 illustrate a further embodiment of the combination generator and toolbox. In FIG. 15 the generator 10 can be seen residing in its own compartment in the toolbox 115. A gas output duct 117 directs the mixture of exhaust and cooling air directly upward. An opening 119 in the lid 118 of the box 115 aligns with the duct 117. In a separate compartment 121 a dedicated gas tank 122 is shown in broken lines. Alternatively a smaller tank than that shown may be provided leaving room for a tool area or other storage. Access to the interior of the generator may be had through a removable front panel 124 and aligned service door 125 into the case 11. Access to the generator is available as well as through the open lid 118 and removable upper cover of the generator case 11. In one preferred alternative embodiment of this arrangement, the removable panel 124 is affixed to the lid and swings up and away from the generator when the lid is opened. Air intake openings may be through the wall of the box that faces the cab of the truck. In this embodiment, the location of the intake duct openings adds to the quieting provided and the exhaust gasses are expelled upwardly at a high rate of speed, reducing exhaust smells at ground level. FIG. 16 shows the closed tool box in the back of a pickup truck. The box 118 very much resembles the typical textured sheet metal tool box generally viewed as acceptable in appearance.

Figure 23:
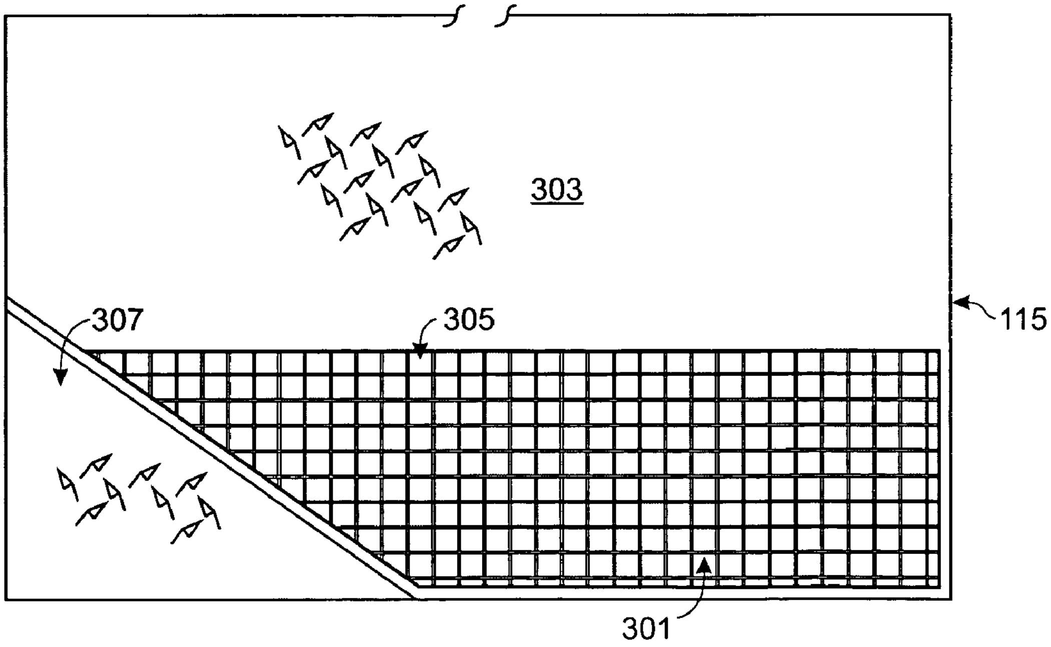
FIG. 23 is a fragmentary end view of the box of FIGS. 15 and 16.

Shown in FIG. 23, the embodiment illustrated in FIGS. 15 and 16 has an air intake opening 301 formed in the right hand side panel 303 of the box 115 as illustrated in FIG. 23. Optional screening 305 is shown to keep animals out of the ducts. The box 115 of the particular embodiment is notched on each side as shown at 307 to accommodate the wheel wells of a short bed pickup truck.

Figure 24:
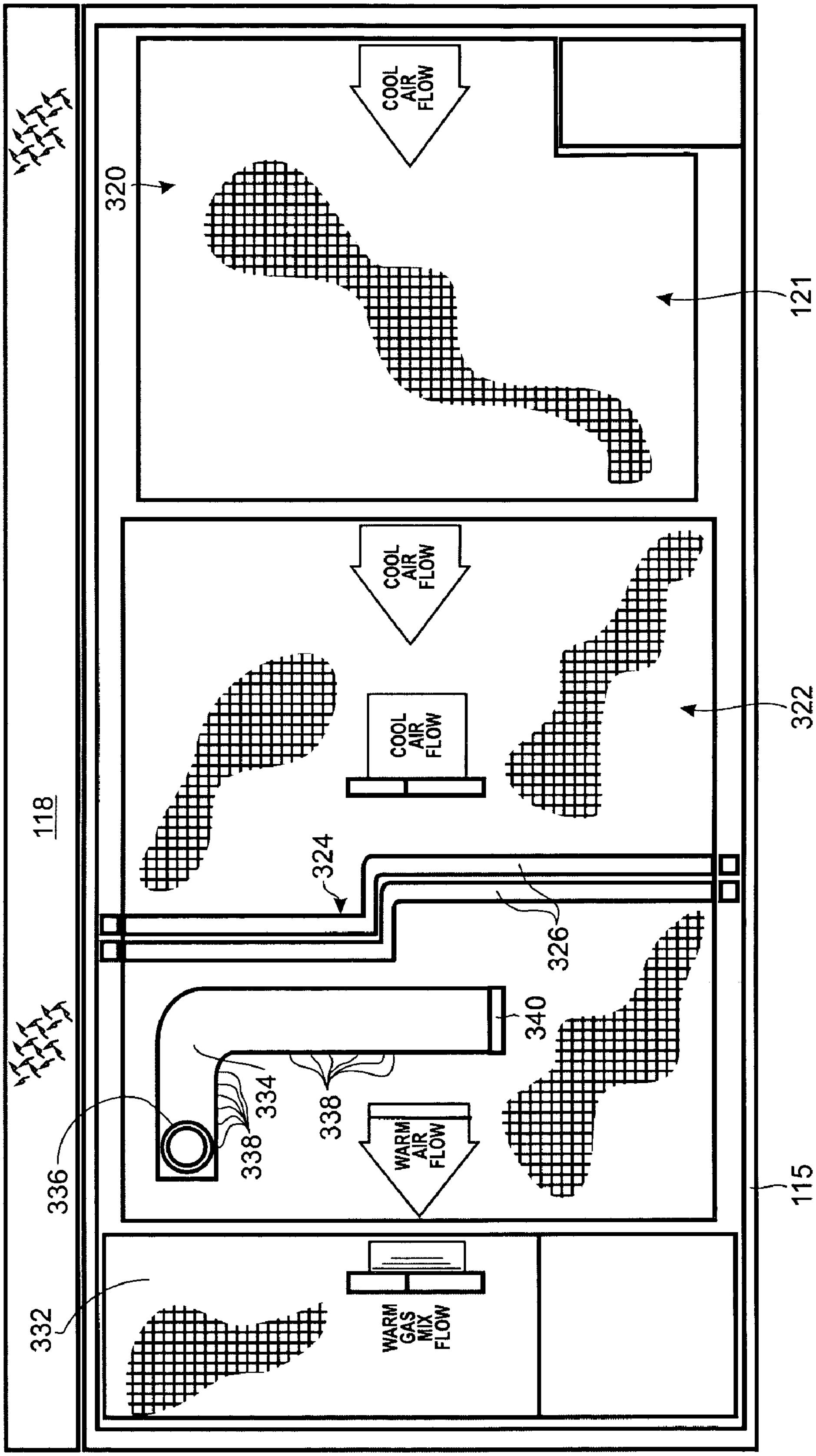
FIG. 24 is a top plan view of the box of FIGS. 15 and 16 with lid open.

In FIG. 24 the floor of the tank containment compartment 121 has been removed and the cold air duct 320 can be seen extending below the compartment to an opening 322 that provides engine and generator cooling air to the generator 10 and combustion air to the generator drive engine. The partitioning wall 324 is shown having a pair of parallel seals 326 extending along its upper edge. To the left of the wall 324 in FIG. 24 is shown the hot air opening 328 that receives warm cooling air from the generator 10 into the duct 330 that extends below the generator 10 to an upright duct portion 332.

In FIG. 24 the optional screening shown covering the duct 330 in FIG. 24 is broken away and a diffuser 334 is seen having an intake pipe 336 for communication with the tail pipe of the internal combustion engine that drives the generator. Small holes 338 are formed in a series along the diffuser 334, which in this case is an L-shaped hollow, rectangular in cross section diffuser capped at its end 340. From the duct 330 intermixed warm cooling air and hot exhaust moves to the upright duct portion 332 and escapes via the opening 119 of FIG. 16.

Figure 17:
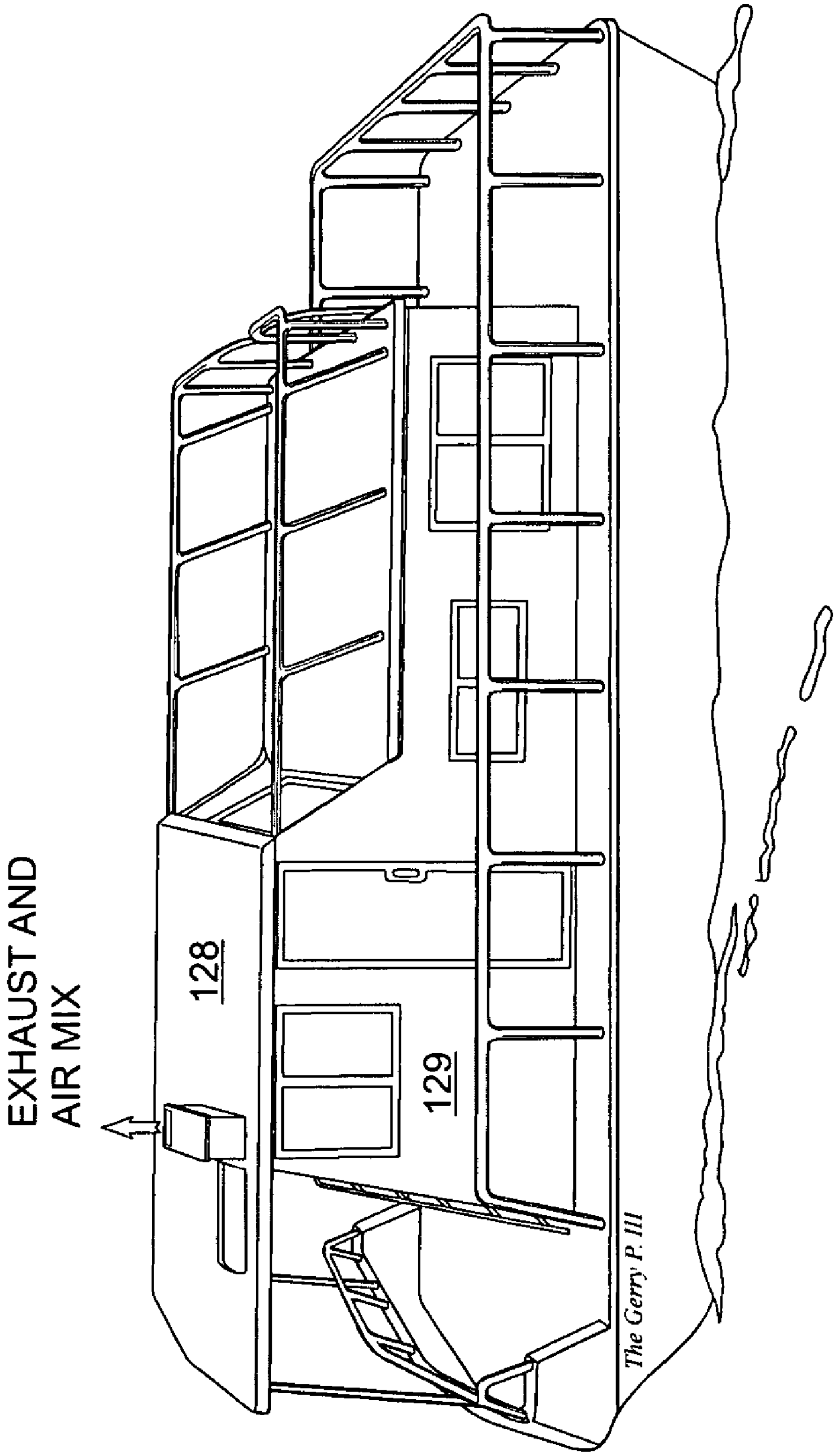
FIG. 17 is a diagrammatic illustration of a toolbox-style generator installation in accordance with the invention mounted on a house boat.

The embodiment of FIGS. 15 and 16 are particularly suited for such uses as houseboats, large cabin cruisers and the like where noxious fumes raise the possibility of asphyxiation, particularly when occupants sleep and the generator runs. As shown in FIG. 17, an installation of a generator-tool box combination of the kind illustrated in FIG. 15 on the uppermost deck 128 well above living and sleeping quarters 129. The upward emission of the exhaust-cooling air mix further moves the carbon monoxide of the exhaust away from the boat inhabitants and where it is most likely to be swept away by the breeze.

Figure 25:
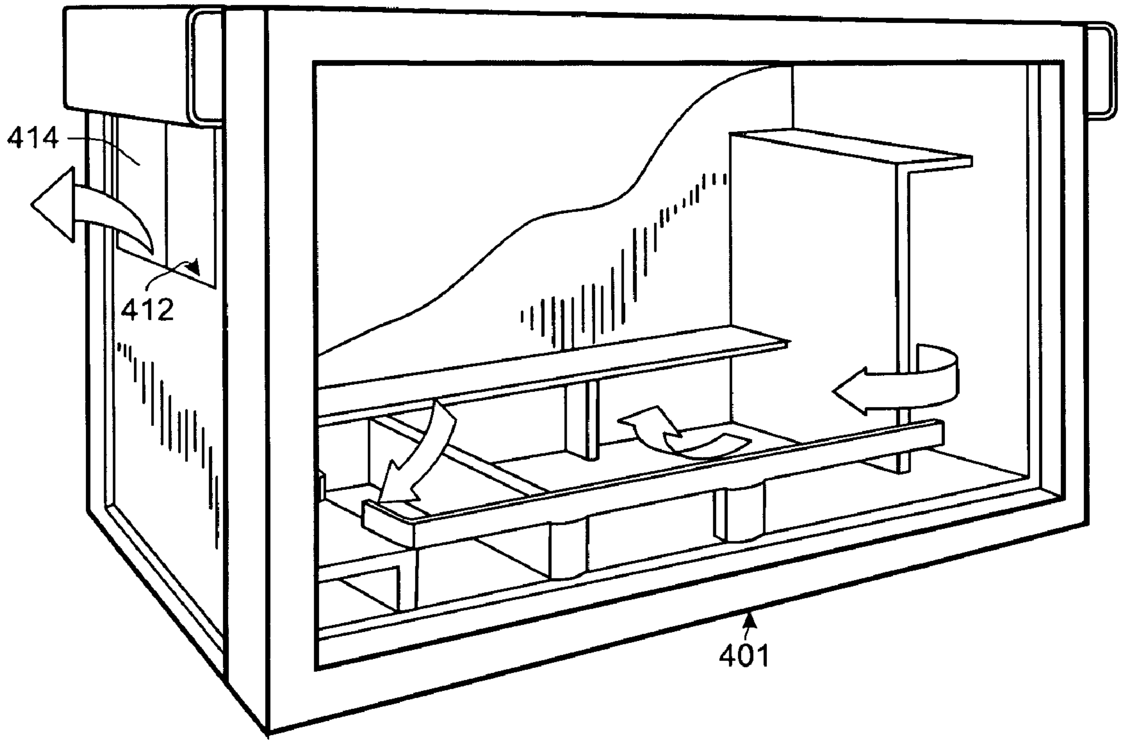
FIG. 25 is a perspective view with parts broken away for clarity of a further embodiment of the combined generator plenum and enclosure of the invention.

In one further embodiment illustrated in FIGS. 25 and 26, cold air is drawn into an enclosure 401 shown in FIG. 25 with its front cover removed. Cold air is drawn into the enclosure through an opening 403 seen in FIG. 25. A duct 404 directs the cold air internally of the enclosure 401 where it is drawn into the cool air supply duct 406 formed below the location for the generator defined by the supporting rim 408. As previously, the cool air is drawn in to the engine-generator set for cooling and aspiration. Warmed cooling air is expelled into a warm air duct 410 below the generator where it is admixed with hot exhaust as previously. The mix of hot exhaust and warm air travels from the duct 410 to an upright duct 412 seen in FIG. 25 and escapes through an opening 414 in a sidewall 416 of the enclosure 401.

The foregoing descriptions of at least one preferred embodiment are exemplary and not intended to limit the claimed invention. Obvious modifications that do not depart from the spirit and scope of the invention as claimed will be apparent to those skilled in the art. The toolbox containing a generator can afford portability by being movable from one truck to another. Also the generator is easily accessible for repairs. In one embodiment, the toolbox is detachable from the generator and support plenum so as to lift away from the generator and enable access to the generator for repairs. Further, with appropriate hinging, the toolbox lid can be opened sufficiently to permit the generator to be lifted free of the box for major repairs or simply for movement to a new site. Where the toolbox and the generator support plenum are built as a single unit as in the exemplary embodiment of FIGS. 7 and 8, the box-plenum combination can be sold shipped as a unit. On the other hand, where the user already has a toolbox, the separate plenum in or under the toolbox can be provided more economically than the provision of a combined box and plenum.

I claim:

1. A generator support plenum and generator enclosing box including:

(a) an upper support surface for bearing the weight of a generator;

(b) a lower surface on which, in use, the plenum rests;

(c) an air intake opening into the plenum opening to atmosphere;

(d) an air intake duct through the plenum from the air intake opening;

(e) an opening out of the plenum from the air intake duct and located for alignment with air intake of the generator;

(f) a gas outlet opening from the plenum to atmosphere;

(g) a gas outlet duct through the plenum to the gas outlet opening;

(h) an opening into the plenum to the gas outlet duct and located for alignment with a cooling air outlet of the generator;

(i) a diffuser in the gas outlet duct located to receive engine exhaust gas from an internal combustion engine driving the generator;

(j) soundproofing on interior surfaces of at least one of the air intake and gas outlet ducts; and (k) the plenum being located outside the generator enclosing box in supporting relation to the box and a generator enclosed in the box, a first opening through a wall of the box in registry with the opening out of the plenum from the air intake duct, and a second opening through a wall of the box in registry with the opening into the plenum to the gas outlet duct.

* * * * *